United States Patent [19]

Tomomatsu

[11] Patent Number: 4,853,235

[45] Date of Patent: Aug. 1, 1989

[54] COLOR-CHANGING CEREALS AND CONFECTIONS

[75] Inventor: Hideo Tomomatsu, Crystal Lake, Ill.

[73] Assignee: The Quaker Oats Company, Chicago, Ill.

[21] Appl. No.: 97,040

[22] Filed: Sep. 16, 1987

[51] Int. Cl.$^4$ ............................ A23L 1/18; A23P 1/08
[52] U.S. Cl. .................................... 426/93; 426/94; 426/103; 426/250; 426/293
[58] Field of Search ................. 426/93, 250, 619, 620, 426/94, 621, 103, 291, 293, 292, 302

[56] References Cited

U.S. PATENT DOCUMENTS

| | | | |
|---|---|---|---|
| 3,322,545 | 5/1967 | Siehrs | 426/250 |
| 3,561,981 | 2/1971 | Roe et al. | 426/293 |
| 3,687,687 | 8/1972 | Liepa | 426/559 |
| 4,089,984 | 5/1978 | Gilbertson | 426/293 |
| 4,379,171 | 4/1983 | Furda et al. | 426/620 |

*Primary Examiner*—Donald E. Czaja
*Assistant Examiner*—Mary S. Mims

[57] ABSTRACT

A cereal or confection capable of changing color instantly upon the immersion in an aqueous medium such as milk comprising a colored ceral or confection base, and an edible opaque powder adhereing to said base in a quantity sufficient to obscure the color of the base and a water soluble non-film forming edible adhesive liquid bonding said powder to said base.

3 Claims, No Drawings

COLOR-CHANGING CEREALS AND CONFECTIONS

BACKGROUND

This invention relates to cereals and confections which change color on contact with aqueous liquid such as milk. It also relates to the process to produce such cereals and confections The presence of even a few pieces of the novel magic-like color changing cereals in accordance with the present invention either alone or mixed with ordinary cereal in a bowl, provides an opportunity to promote children's interest and appetite in the consumption of the nutritious food.

In the field of cereals and confections, visual attraction is an important factor. It is particularly so in the field of children's food such as breakfast cereal and snacks. Because of this, the cereal industry has been making a great effort to enhance the visual attraction of children's breakfast cereals. Thus, there are many children's breakfast cereals which contain various colored cereals, and cereals that contain some colored pieces, and some cereals containing various amounts of colored confections such as dried marshmallows in various shapes, etc.

This invention enhances the visual attraction of cereals and confections by providing cereals and confections which change color on contact with aqueous edible medium such as for example, cold milk, hot water, etc.

It should also be pointed out that an important objective of the present invention is to avoid the use of chemical additives which would give an impression to consumers that the color changes are due to some kind of a chemical reaction.

By way of background, it should also be pointed out that there are many ready-to-eat cereals presently available that are "frosted." These cereals involve a paint-like coating which is applied in the form of a liquid suspension of opaque edible materials, which is then dried to provide a solid film which includes the opaque edible material.

It is an object of the present invention to provide a ready-to-eat cereal or confection which instantly changes color on contact with an aqueous like such as for example, with milk, and to provide a process for producing such cereals and confections. It is an object of the present invention to achieve this result without the use of color changing chemical additives.

It is a further object of this invention to provide an instantly color-changing cereal or confection which does not affect the color of the aqueous medium such as milk when immersed in it.

SUMMARY OF THE INVENTION

These and other objects are provided by the ready-to-eat cereal or confection, and by the method of the present invention. In accordance with the present invention an already colored or non-colored cereal piece or confection base is coated with a water soluble liquid capable of causing an edible opaque powder to adhere to the cereal piece or confection base in a quantity sufficient to obscure the color of the cereal base piece. Thus, the color changing cereals or confections so prepared change colors easily, substantially instantly, on addition of cold milk, cold or hot water, etc.

In accordance with the present invention the edible opaque powdered material can include any kind of solid sugar or reducing sugar or other opaque edible powder such as starch or titan white. However, the finer the powder, the better the color covering ability seems to be. Therefore, in practice a confectioner's sugar is a most convenient opaque edible powder to be used for this invention, but any kind of sugar or reducing sugar such as dextrose, fructose, lactose, maltose, sorbitol, xylitol, maltotol, etc. and other edible opaque powders such as starch or tital white are usable. It is preferred that the water soluble opaque powder be one which is colorless when dissolved in water.

Thus, in accordance with the present invention, a cereal base such as a bite-sized ready-to-eat cereal, or a confection base, such as bite-sized pieces of marshmallow, or the like, are colored using edible food coloring to provide a base material for use in accordance with the present invention. These materials are then coated with the water dispersible non-film forming liquid such as for example glycerol, glycerol esters, polysorbates, polyglycerol esters of fatty acids, solutions of sugar in glycerol, and the like.

Thus in accordance with this invention, for example, cereals or confections having various colors may be first placed in an enrober and may be sprayed with a small amount of glycerol. The amount of glycerol may be varied, but usually 0.05 to 10.0 weight percent to the substrate is sufficient to adhere the powder to the base. The preferred amounts of adhesion liquid is between 0.1 and 8.0% by weight. The glycerol-sprayed substrate may then be placed in another enrober, for example, and enrobed with confectioner's sugar. Enrobing in this way requires sufficient rotation time to give a white colored color-changing cereal or confection. The amount of confectioner's sugar may be varied depending on the desired thickness of the powder coating, and typically between about 30% to 200% by weight of the substrate can be used to advantage.

DETAILED DESCRIPTION OF THE INVENTION

The art of making ready-to-eat cereals is well established and known throughout the world. The ready-to-eat cereal pieces used as the base material in accordance with the present invention can be made by any of the well known methods for making ready-to-eat cereals whether they be methods involving flaking, rolling, extruding, or "shooting" grains from guns.

In accordance with the present invention, the base piece is colored by any conventional means using color solutions and the like. For example, a red color can be provided by FD&C red #3, green can be provided by fast emerald green shade, a mix of FD&C blue #1 and FD&C yellow #5, and yellow can be provided by FD&C yellow #5 powder.

Cereal pieces which have been extruded or otherwise made from doughs having the color material incorporated into the dough prior to shaping are the preferred base or substrate for use in accordance with the present invention.

Many ready-to-eat cereals produced these days involve high speed cooker-extrusion under expansion conditions.

In accordance with the preferred embodiments of the present invention, the ready-to-eat cereal base piece, for example, an expanded extruded cereal dough, is dried to a moisture level below about 10%, and is "glazed" with a solution of syrup or fat to reduce the porosity and to increase the flavor and bowl life. Such a glazing of the base piece is entirely conventional although the use of glazed pieces as the base in accordance with the present invention is a preferred aspect thereof.

A water dispersible liquid is then applied to the glazed or unglazed cereal base piece, for example, by spraying a tumbling bed of the cereal base pieces in an enrober. When glazed base pieces are used, non-film forming liquid such as glycerol or glycerol solution in an amount between 0.5 and 10% can be used. Preferably from about 1% to about 3% glycerine, for example, is sufficient to carry out, and to produce a preferred cereal in accordance with, the present invention.

The glycerine coated pieces are preferably transferred to another clean and dry enrober, where they are then enrobed with an edible opaque powder such as, for example, confectioner's sugar or a mixture of colored or non-colored starch and confectioner's sugar. The powder is adhered to the individual pieces by the previously applied liquid, e.g. glycerine, and the addition of the powder is continued until there is sufficient powder adhering to the pieces to obscure or hide the color of the base piece.

After the pieces are thus powdered, they have the color of the powdery material, e.g. white when pure confectioner's sugar is applied.

Alternatively, colored powders such as colored flour-powder sugar mixtures can be employed but it is preferred that a colored cereal base be applied when a colored outer layer is desired. The use of dyes or other water soluble colorants in the water soluble edible powder will result in a change in color of the milk, and in some instances this is regarded as less desirable. A preferred colored powder, for example, is finely ground, internally colored cereal pieces used as the base, but having different colors from the base piece color.

The resulting color-changing pieces can be used en-mass, or mixed sparingly in cereals having no colors or bland uninteresting natural colors. Upon mixing milk with the resulting cereal the edible powdered surface is instantly dissolved, revealing the specific colors of the individual pieces virtually instantly.

The following examples illustrate and explain the present invention but are not to be taken as limiting the present invention in any regard.

As in the examples hereinafter, all parts are in parts by weight, all percents are in percents by weight, based on the weight of the material being referred to, and all temperatures are expressed in degrees fahrenheit.

EXAMPLE 1

50.00 parts of red colored cereal pieces commercially available as Cap'n Crunch Crunchberries(TM The Quaker Oats Company) cereal was placed in an enrober having a barrel 14" in diameter and 6" depth tilted at about 45 degree angle. The red colored Crunchberry pieces were sprayed while the drum was rotating at a rate of about 10 rpm with fine particles of glycerol until the 50.00 parts Crunchberry bed increased in weight to 52.0 parts.

The glycerol-sprayed Crunchberry was then placed in the same but freshly cleaned enrober with a 100 parts of confectioner's sugar. The mixture was enrobed in the enrober rotating at about 10 rpm. When the enrobing was continued about 5 minutes, about 60% of the sugar was already picked up. The enrobing was continued totally about 10 minutes giving a well sugar-covered completely white colored Crunchberry. The weight of the product was 122.0 parts.

A portion of the white colored Crunchberry was blended with approximately an equal volume of honey-colored Cap'n Crunch (TM The Quaker Oats Company) cereal and to this was added cold milk. With a normal spoon stirring, the white colored Crunchberries changed to beautiful milky red colored cereal amost instantly. Continuation of the stirring for another 1 minute resulted in changing the milky red color to a brighter red color. No obvious dispersion of red color into milk was observed.

Another portion of the white colored Crunchberry was mixed with a commercially available Instant Oatmeal (The Quaker Oats Company), and to this was added a proper amount of hot water. The white colored Crunchberries changed color to bright red color instantly. The Crunchberries did not become deformed at all by the addition of hot waster, and also there was no obvious dispersion of the red color into the hot water.

EXAMPLE 2

By the same method as described in Example 1, 100.00 g. of commercially available colored cereal, Trix (TM General Mills Company) was subjected to a fine mist of glycerol by spraying until the cereal bed's weight reached 103.62 g. Trix was employed as the substrate because it consisted of a mixture of red, orange, yellow, and grape colored round shaped cereal pieces The appearance and crispness of the cereal showed no apparent changes after the spraying of this amount of glycerol.

The glycerol-sprayed cereal was enrobed with 207.24 g. of confectioner's sugar for 10 minutes as described in Example 1. It gave a 285.58 g. of well sugar-coated, completely white round shaped cereal. The inside color of the product was undetectable by mere as-is observation, after the white coating.

As described in Example 1, the white colored product was mixed with a honey-colored commercially available Cap'n Crunch (TM The Quaker Oats Company) cereal, and to this was added cold milk. With a normal spoon stirring, the white colored product changed to variously colored cereals in about 15 seconds to give a beautifully colored bowl of cereal consisting of red, yellow, orange, and grape colored cereal distributed in a honey-colored Cap'n Crunch cereal in milk. No dispersion of color was observed by the addition of milk.

Similarly a portion of the product was mixed with a commercially available Instant Oatmeal (The Quaker Oats Company), and to this was added a proper amount of hot water. The white colored product changed into red, orange, yellow or grape colored cereal instantly to give beautifully colored pieces distributed in the bowl of hot oatmeal. Neither dispersion of colors into the water, nor deformation, nor disintegration of the colored cereal pieces was observed to occur upon the addition of hot water.

EXAMPLE 3

In this test, the applicability of this invention to a substrate having other shapes than spherical shape was investigated using Froot Loops TM (General Mills Company) cereals having a small doughnut shape in diameter of about 6/8" and the diameter of the inside hole about 3/16".

100.00 parts of Froot Loops cereal containing 3.34 weight percent of glycerol, prepared by the method described in Example 1; a 30 parts sample was removed, was enrobed with 60.00 parts of confectioner's sugar for 15 minutes as described in Example 1, to give 81.40 g. of almost completely sugar coated, white colored doughnut-shaped cereal after shaking off. The "loss" in material balance is due to powdered sugar which didn't stick, but which could be recycled. The inside cereal color was undetectable after the confectioner's sugar coating.

EXAMPLE 4

In this experiment, a powdered red colored Trix TM (General Mills Company) cereal was premixed with a confectioner's sugar to give a pink colored cereal powder.

Thirty five parts of whole multi-colored Trix cereal pieces was sprayed with 2.80 weight percent of glycerol, prepared as described in Example 2. The sprayed material was then enrobed with 70 parts of a mixture consisting of 56.00 g. of confectioner's sugar and 14.00 g. of finely pulverized red colored Trix cereal. The pulverized red colored Trix cereal was prepared by grinding first and then passing through a Brinkman centrifugal grinding mill equipped with a pore size 0.2 mm screen.

The enrobing was carried out for about 20 minutes to result in a 72.39 parts of pink colored spherically shaped cereal.

The resulting cereal changed color almost instantly upon being immersed in milk. No strong noticeable pink color seepage in milk, or in hot water tests, was observed.

EXAMPLE 5

A substantially spherical ready-to-eat standard base is produced from an approximately 15% moisture "dry" mix comprising 66% yellow corn flour, 11% oat flour, 10% rice flour, 2% salt and 10% sugar, and an edible coloring agent. Upon being fed through a high pressure extruder the resulting dough is extruded under expaning conditions, and cut into bite-size pieces to provide pieces with an uncoated density of 4-6 ounces/121.5 cubic inches. Upon being extruded the extrudate is cut at the die into individual bite-sized pieces, and the pieces are dropped into a high temperature, high velocity air stream, as is conventional, to provide a dry extruded cereal base piece at less 10% moisture. The base piece dry mix includes FD&C Red #3 for red pieces, a mixture of FD&C Blue #1 and FD&C Yellow #5 for green pieces, and FD&C Yellow #5 powder for the yellow extrudate.

A syrup is then applied at about 170° F. in a tumbling bed enrober to the base piece as glaze. The syrup comprises a solution of sucrose (58%), brown sugar (4%), salt (1%), vitamins/mineral premix (0.06%), water (18%), fruit punch flavor (0.5%), 42 DE corn syrup (11%) and coconut oil (5%). The syrup glazing is applied at the ratio of 45 parts to about 55 parts base. The glazed base is then dried to a moisture of about 2.0±0.05%, and the dried glazed base is coated with glycerol in a ratio of 6 parts glycerol to 94 parts coated base. Thereafter, powdered sugar is added to the glycerol wetted base pieces in an amount sufficient to obscure the color of the individual cereal base pieces, and approximately 6% of glycerol based on the weight of the glycerol wetted coated base was sufficient to achieve that result. The resulting cereal appears white similar to frosted cereals, except that the white outermost portion remains in a powdery condition. Thus it is quite different from the "frosted" cereals in which the white outermost portion is provided in the form of an integral paint-like film.

EXAMPLE 6

40.00 g. of variously shaped and variously colored dried marshmallow bits was sprayed with glycerol in an enrober to 42.43 g. The enrober was cleaned and again using the enrober, the glycerol sprayed dried marshmallow was blended with 60.00 g. of confectioner's sugar. It required only about 6 minutes to pick up all the powder sugar. The product's color was completely concealed with the white sugar bound with glycerol.

About equal volume of this product is mixed with a honey-colored commercially available Cap'n Crunch( TM Quaker Oats Co.) cereal, and to this was added milk. With a normal spoon stirring, the white colored product changed to variously colored cereals in about 17 seconds to give a beautifully colored bowl of cereal.

DISCUSSION

When any of the cereals produced in accordance with the Examples herein are placed in a bowl and milk is added, the white coating disappears virtually instantly as if by magic, revealing the true color of the base cereal piece. It is noted that when attempts were made to cause the opaque edible outer powder to adhere to the cereal pieces by means of later-applied syrups, and the like, not only was the "opaquing" character of the powder substantially eliminated, but the resulting film, rather than powder, was not readily dissolved in the milk.

In accordance with the present invention the cereal making art is provided with a method of making a "fun" experience out of eating an otherwise nutritious and tasty ready-to-eat cereal.

Therefore, I claim:

1. A ready-to-eat cereal capable of changing color instantly upon immersion in an aqueous medium such as milk, said ready-to-eat cereal comprising:
   a. A solid colored cereal or confection base, in which the true color of the base will not undergo dispersion is said aqueous medium,
   b. An edible opaque powder adhering to said base in a quantity sufficient to obscure the color of the base, and
   c. A water soluble non-film forming edible adhesive liquid bonding said powder to said base, and in which the water soluble liquid is glycerine.

2. A method of making a ready-to-eat cereal capable of changing color instantly upon immersion in an aqueous medium such as milk, said method comprising:
   a. Preparing a solid bite-sized cereal base having a color.
   b. Coating said base with a syrup, or oil to reduce porosity;
   c. Drying the cereal base to a moisture level below about 15% of the provided dried base;
   d. Applying a water soluble non-hardening liquid to the dried base, in an amount between $\frac{1}{2}$% and 10%, based on the weight of the coated base; and
   e. Applying to the thus wetted base an opaque edible powder in an amount sufficient to obscure the color of the base.

3. The method of claim 2 in which the base is syrup coated and dried to a moisture level of less than 10% the syrup coating having been dried to a solid non-tacky glaze, and in which said non-hardening water soluble liquid is glycerine, and in which the opaque edible powder includes powdered sugar.

* * * * *